(12) United States Patent
Lopes et al.

(10) Patent No.: US 6,453,176 B1
(45) Date of Patent: Sep. 17, 2002

(54) ANTENNA ARRAY SYSTEM

(75) Inventors: Luis Lopes, Swindon (GB); Eric Villier, Swindon (GB); Stephen Basil Aftelak, Swindon (GB); Ray Owen, Bath (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/468,626

(22) Filed: Dec. 21, 1999

(30) Foreign Application Priority Data

Feb. 8, 1999 (GB) ............................................. 9902563

(51) Int. Cl.⁷ .............................. H04B 1/38; H04M 1/00
(52) U.S. Cl. ...................... 455/562; 455/69; 455/436; 342/374
(58) Field of Search .............................. 455/562, 277.1, 455/277.2, 436, 69, 522; 342/374

(56) References Cited

U.S. PATENT DOCUMENTS

| | | | | |
|---|---|---|---|---|
| 5,714,957 A | * | 2/1998 | Searle et al. ................ | 342/154 |
| 5,771,017 A | * | 6/1998 | Dean et al. .................. | 342/374 |
| 5,907,816 A | * | 5/1999 | Newman et al. .......... | 455/277.2 |
| 6,108,323 A | * | 8/2000 | Gray ........................... | 370/335 |
| 6,141,335 A | * | 10/2000 | Kuwahara et al. .......... | 370/342 |
| 6,208,863 B1 | * | 3/2001 | Salonaho .................... | 342/109 |
| 6,252,542 B1 | * | 6/2001 | Sikina et al. ................ | 342/174 |
| 6,311,075 B1 | * | 10/2001 | Bevan et al. ................ | 342/368 |
| 6,345,188 B1 | * | 2/2002 | Keskitalo et al. ......... | 455/277.2 |

FOREIGN PATENT DOCUMENTS

| | | |
|---|---|---|
| EP | 0639035 A1 | 7/1994 |
| GB | 2295524 A | 5/1996 |
| GB | 2313523 A | 11/1997 |
| GB | 2332122 A | 6/1999 |
| WO | WO 88/04837 | 6/1988 |
| WO | WO97/27643 | 7/1997 |
| WO | WO99/52173 | 10/1999 |
| WO | WO99/57574 | 11/1999 |

* cited by examiner

Primary Examiner—William Trost
Assistant Examiner—Simon Nguyen

(57) ABSTRACT

This invention relates to an antenna array system. A problem with antenna array systems is that they provide rather inefficient use of hardware and have inflexible resource allocation. The invention provides a flexible antenna array system architecture, which has very flexible allocation of transceiver elements to beams. The invention comprise switching means (407) which associate transceiver elements (405) to beam ports of a beam former (403) connected to a antenna array (401). The association of transceiver elements (405) to beam ports are rearranged regularly, typically for each time slot, and the association is optimized for overall performance for all subscriber units. The invention is applicable for example to cellular communication systems such as GSM.

21 Claims, 4 Drawing Sheets

| | TIMESLOT 0 | TIMESLOT 1 | TIMESLOT 2 | TIMESLOT 3 | TIMESLOT 4 | TIMESLOT 5 | TIMESLOT 6 | TIMESLOT 7 |
|---|---|---|---|---|---|---|---|---|
| BEAM 1A | TRX1 | TRX1 | TRX2 | TRX3 | TRX2 | TRX3 | TRX1 | TRX2 |
| BEAM 1B | TRX3 | | | | TRX1 | | TRX3 | TRX3 |
| BEAM 2 | | TRX3 | TRX1 | | | | TRX2 | |
| BEAM 3 | TRX2 | | | TRX2 | | TRX2 | | |
| BEAM 4 | | | | TRX1 | TRX3 | | | TRX1 |

-PRIOR ART-

|  | TIMESLOT 0 | TIMESLOT 1 | TIMESLOT 2 | TIMESLOT 3 | TIMESLOT 4 | TIMESLOT 5 | TIMESLOT 6 | TIMESLOT 7 |
|---|---|---|---|---|---|---|---|---|
| BEAM 1A | TRX1 | TRX1 | TRX2 | TRX3 | TRX2 | TRX3 | TRX1 | TRX2 |
| BEAM 1B | TRX3 |  |  |  | TRX1 |  | TRX3 | TRX3 |
| BEAM 2 |  | TRX3 | TRX1 |  |  |  | TRX2 |  |
| BEAM 3 | TRX2 |  |  | TRX2 |  | TRX2 |  |  |
| BEAM 4 |  |  |  | TRX1 | TRX3 |  |  | TRX1 |

ANTENNA ARRAY SYSTEM

FIELD OF THE INVENTION

This invention relates to an antenna array system and in particular to an antenna array system used in a cellular communication system.

BACKGROUND OF THE INVENTION

Antenna arrays for radio communication consisting of a plurality of correlated individual antenna elements are known. Typically, the individual antenna elements are simple dipoles equidistantly situated with a distance of typically half a wavelength. When transmitting the Radio Frequency (RF) signal is fed to all the antenna elements and when receiving the signals from all antenna elements are combined together. Depending on the relative phase difference and amplitude between the signals of each antenna element the combined effect of the entire phase array will have a propagation pattern equivalent to a directional antenna, i.e. more energy will be transmitted or received in some directions than in others.

Antenna array systems for communication systems are known which comprise an antenna array, a beamformer providing a number of fixed beams and a transceiver for each of the fixed beams. In a communication system a signal is received or transmitted using the fixed beam which provides the best communication for that user and switching to another beam will only occur when the signal in the current beam degrades below a threshold.

A problem with the above antenna array systems is that they are complex and result in inflexible resource and hardware allocation to individual beams. Furthermore, traditional antenna arrays comprise technology, which is bulky, expensive and inefficient. Especially, RF (Radio Frequency) power amplification in traditional antenna arrays is associated with high complexity, low efficiency and/or high cost.

SUMMARY OF THE INVENTION

The invention seeks to provide a flexible antenna array system with high performance hardware.

According to the present invention, there is provided an antenna array system comprising at least a first antenna array; first beamforming means providing a plurality of beam ports, each beam port being associated with a directional beam of the first antenna array; a plurality of transceiver elements; switching means for associating the plurality of transceiver elements with the plurality of beam ports; wherein the plurality of transceiver elements by the switching means are dynamically associated with the plurality of beam ports in response to a desired beam direction for radio communication supported by each of the plurality of transceiver elements and the association of transceiver elements to beam ports is rearranged at substantially periodic intervals.

This provides for a very efficient and flexible utilisation of resource and transceiver elements.

Preferably, the association of a first transceiver element of the plurality of transceiver elements to beam ports is at least partly in response to a parameter associated with a characteristic of a radio communication supported by a second transceiver element of the plurality of transceiver elements. This allows optimised total performance for all subscriber units served by the antenna array system.

According to a first feature of the invention, the antenna array system has a plurality of beam ports which is larger than the plurality of transceiver elements.

Preferably, the antenna array system further comprises at least a second antenna array providing at least partial diversity with respect to the first antenna array; at least second beamforming means increasing the plurality of beam ports by providing a further plurality of beam ports each being associated with a directional beam of the second antenna array; and wherein the directional beams of the second antenna array are offset and overlapping with respect to the directional beams of the first antenna array.

According to a second feature of the invention, the antenna array system is incorporated in a Time Division Multiple Access communication system, such as GSM, and the switching means are operable to change the association of the plurality of transceiver elements with the plurality of beam ports on a time slot basis.

The transceiver elements can include receiver elements or transmitter elements. Preferably the plurality of transceiver elements comprises transmitter elements and receiver elements and the switching means are operable to independently associate receiver elements and transmitter elements with the plurality of beam ports.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following is written in the context of a cellular communication system and specifically in the context of the Global System for Mobile communication (GSM) cellular communication system. However, it will be apparent to a person skilled in the art that the invention is not limited to this application. Other possible applications include all receiving and transmitting systems using antenna arrays as well as related fields such as radar.

Figure 1:
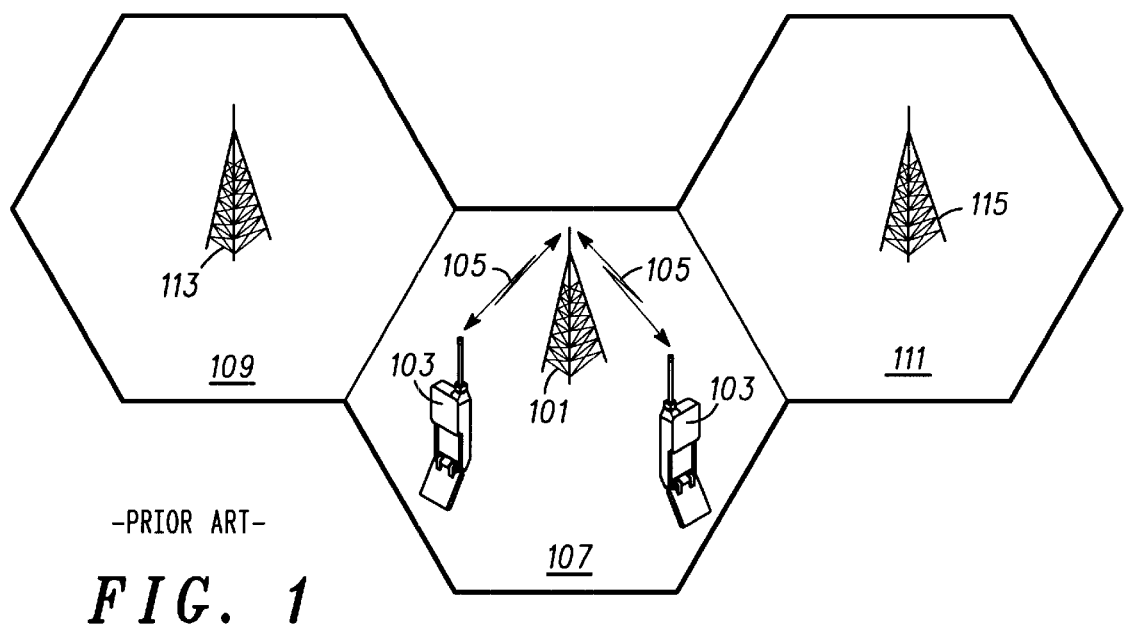
FIG. 1 is an illustration of a GSM cellular communication system according to prior art.

In a cellular communication system each of the subscriber units (subscriber units) communicates with typically a fixed base station. Communication from the subscriber unit to the base station is known as uplink and communication from the base station to the subscriber unit is known as downlink. The total coverage area of the system is divided into a number of separate cells each covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107 whereas other geographical areas 109, 111 are covered by other base stations 113, 115. Typically, each of the base stations 101, 113, 115 contain a broadcast carrier plus one or more traffic carriers. As a subscriber unit moves from the coverage area of one cell to the coverage area of another cell, the communication link will change from being between the subscriber unit and the base station of the first cell to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a subscriber unit is routed through the fixed network to the destination specific for this call. If the call is between two subscriber units of the same communication system the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the subscriber units (mobile stations) and the base stations. This spectrum must be shared between all subscriber units simultaneously using the system. In the Global System for Mobile communications (GSM) and similar systems this is achieved by dividing the spectrum into a number of frequency channels.

In GSM each of the frequency channels are furthermore divided into eight distinct time slots. By allocating a time slot to each active subscriber unit, eight subscriber units can thus be served by each frequency channel. This approach is known as Time Division Multiple Access (TDMA). Each cell is allocated a number of frequency channels. As the number of frequency channels is limited, the same frequency channels are typically allocated to more than one cell. This is known as frequency re-use and the tighter the frequency reuse, i.e. the closer together the same frequency channel can be used, the higher is the achievable traffic capacity of the system.

The quality of the radio communication between the subscriber unit and the base station is determined by the signal to noise level of the signals. Other base stations and subscriber units generate interference, which increases the noise level and thus reduces the quality. In order to attain an acceptable quality level the interference must thus be kept sufficiently low. The interference can be generated from transmissions on the same frequency channel which is known as co-channel interference. Alternatively, it can be generated from transmissions on adjacent channels as it is not possible to prevent unwanted emissions outside the allocated frequency channel. This interference is known as adjacent channel interference. As the interference level reduces with increasing distance to the interferer, the interference level will be increased for tighter frequency re-use. Today's cellular communication system incorporates other measures to minimise interference levels. These include power control whereby the transmitted power is minimised.

Another important method for reducing interference is by using directional antennas whereby power is only transmitted in the desired direction for optimal signal quality of the desired receiver. When receiving a directional antenna will attenuate the interference received from the other directions thereby allowing the transmitter to transmit at lower power.

Directional antennas are typically physically large and expensive and therefore impractical at the subscriber unit and most directional antennas are deployed at the base stations. The most suitable directional antennas are antenna arrays consisting of a plurality of antenna elements. By individually adjusting a relative phase correction for each element the antenna array will have a directional beam pattern. The operation of antenna arrays is described in 'Introduction to adaptive arrays' by Monzingo and Miller, 1980, Wiley Publishing.

Figure 2:
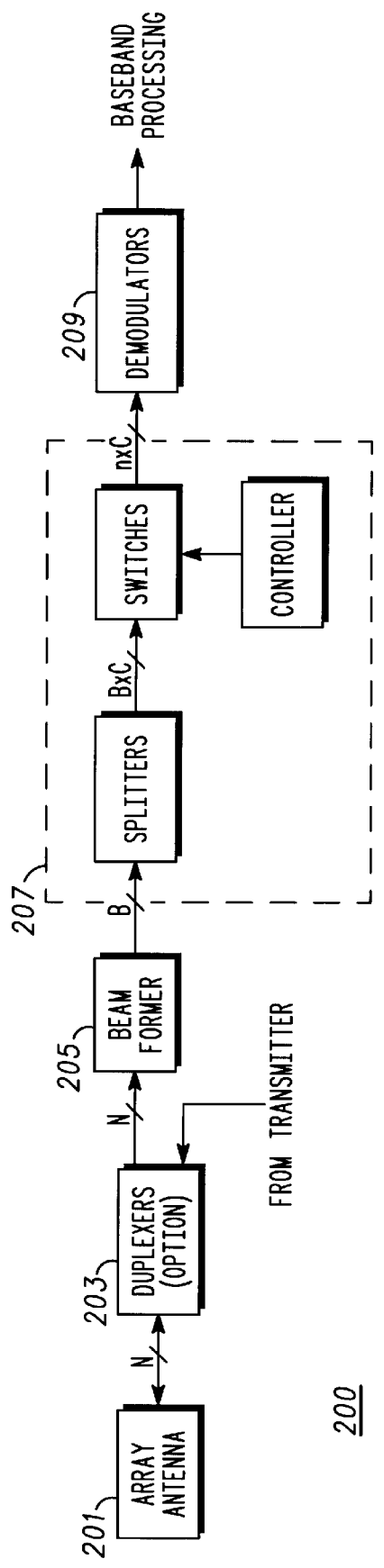
FIG. 2 illustrates an embodiment of a receiving antenna array system in accordance with the current invention.

FIG. 2 is a block schematic of an embodiment of an antenna array system 200 for a receiving system in accordance with the present invention.

An antenna array 201 having N antenna elements is connected to N duplexers 203 which allow the same antenna array to be used both for receiving and transmitting. The duplexer outputs are connected to a beam former 205 which in the present embodiment is a fixed beam former such as a Butler Matrix beam former 205. Alternatively, the duplexer can be connected to the beam port and the same beamformer used for both receiving and transmitting. The beam former 205 provides the appropriate phase correlations between the antenna elements to generate B directional beams and provides a beam port for each directional beam. In such RF beamformed systems, a number of fixed beams is thus provided to the transmitter or receiver. Effectively the antenna inputs provided are the beam ports. This is roughly equivalent to having a bank of separate narrowbeam antennas.

The beam ports are connected to switching means 207, which feeds the received signal from the directional beams to a number of receiver elements 209. Each beam port of the beam former 205 is connected to a splitter, which divides the received signal from a beam into C signals. Apart from the splitters the switching means comprise a set of switches capable of switching the splitter outputs to any of the receiver elements. The switches are controlled by a controller which is implemented as a software program running in a suitable processor such as a micro processor, a micro controller or a digital signal processor.

Figure 3:
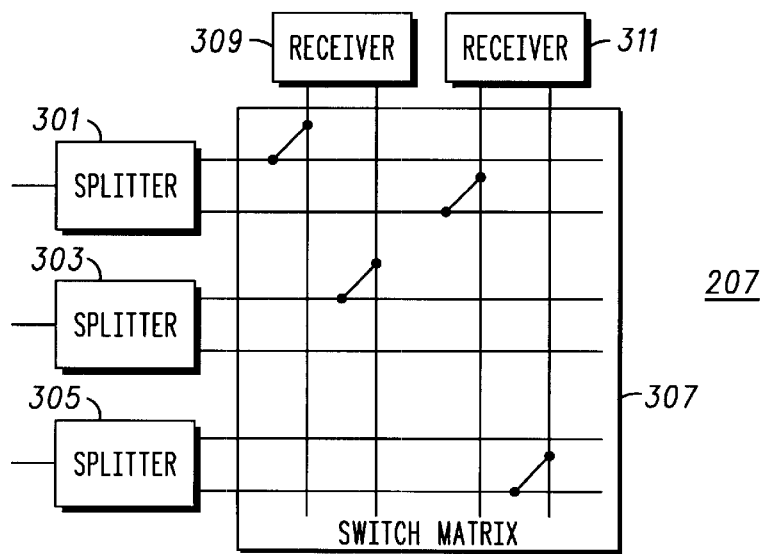
FIG. 3 illustrates an embodiment of the switching means of the receiving antenna array system of FIG. 2.

FIG. 3 illustrates an embodiment of the switching means. In this example the beam former provides three beam ports (B=3) and each of these are fed to a splitter 301, 303 and 305. Each of the splitters 301, 303 and 305 provides two outputs for a switch matrix 307. In this embodiment, the receiver elements consist of complete GSM receivers 309, 311, each of these receivers 309,311 having two inputs. A signal received on both of these inputs is combined in the receiver for optimal detection. The receivers 309,311 will as well as combining the signals perform channel selection filtering and all other functions needed for receiving the signal. In one time slot, the first receiver 309 may be communicating with a subscriber unit simultaneously received at the base station in Beam 1 and 2, whereas the second receiver may support a subscriber unit simultaneously received in Beam 1 and 3. FIG. 3 illustrates the switch matrix 307 in this situation. In the next time slot, the subscriber units supported by the receivers may be in different beams and the switch matrix is updated to reflect this new situation. In the example the number of inputs to the switching means is thus equal to the number of beams, and the number of outputs equal to the product of the number of inputs of each receiver element and the number of receiver elements.

It is apparent that the distribution of receiver functions with respect to the switching means can be varied so that some receiver elements are affected by the switching matrix whereas other receiver elements are not affected. The receiver elements associated with each beam by the switch matrix can thus be entire receivers or can be a specific receiver function being allocated to different beams as required. It is also clear that more than one receiver element can simultaneously be associated with the same directional beam.

For example, in an alternative embodiment specifically appropriate to Code Division Multiple Access, frequency selective filters may be provided on each beam prior to the switching. In this embodiment each receiver element has a single input and is only able to track and receive a single multipath signal component. Each receiver element will in this case correspond to a single RAKE finger in a conventional CDMA RAKE receiver. (Ref 'Spread Spectrum CDMA Systems for Wireless Communications', Savo Glisic & Branca Vucetic, Artech House Publishers 1997, ISBN 0-89006-858-5). In each switch time interval, the receiver elements can be connected to the directional beams in accordance with the required number of RAKE fingers for the subscriber unit supported in that switch time interval in that beam. This allows for a very flexible and efficient allocation of receiver computational resource to the beams most requiring it.

The association of receiver elements to beam ports is rearranged at substantially periodic intervals. In a GSM application the rearrangement is preferably updated for every timeslot, thereby allowing optimal allocation for the traffic distribution in that specific timeslot regardless of the traffic distribution in other timeslots. The association for a specific timeslot may furthermore be re-evaluated and changed for each new frame, which corresponds to a new resource allocation being determined and applied for each new time slot. Alternatively, the association may remain unchanged for the same timeslot in different frames. In this case a reallocation of resource may be event triggered and only occur when for example setting up a new call, handing over to a different base station etc.

The invention allows for a highly efficient and flexible use of hardware resources in an antenna array system. According to one embodiment the number of receiver elements is less than the number of directional beams. Accordingly, the benefits of a high number of highly directional beams can be utilised while not requiring a receiver structure for each directional beam. For example, if an antenna array system has eight directional beams but only supports two carrier frequencies with one receiver allocated for each carrier, the architecture presented allows each of the receivers to be connected to any of the eight beams.

The invention is not limited to association of receiver elements. Rather transceiver elements can be associated to directional beams including receiver elements, transmitter elements or combinations thereof.

Figure 4:
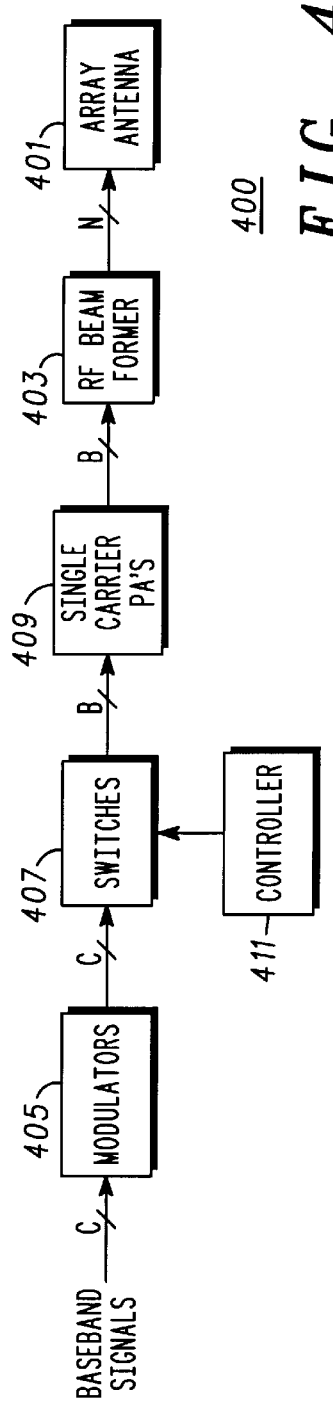
FIG. 4 illustrates an embodiment of a transmitting antenna array system in accordance with the current invention.

FIG. 4 illustrates an embodiment for a transmitting antenna array system 400. An antenna array 401 having N antenna elements is connected to a beam former 403 which in the present embodiment is a fixed beam former such as a Butler Matrix beam former 205. As for the receiving system the beam former 403 provides a separate beam port for each beam and again the antenna array 401 and beam former 403 is equivalent to a bank of separate narrowbeam antennas. If the antenna array system is to be used for both receiving and transmitting, the beam former can be connected to the antenna array through duplexers. Alternatively the duplexer can be connected to the beam port and the same beamformer used for receiving and transmitting.

A base band signal to be transmitted is fed to one out of C modulators 405 and the modulated signals are fed to switching means 407. The output of the switching means is connected to a number of power amplifiers each of these power amplifiers 409 is connected to a single beam port of the beam former 403. The power amplifiers are here shown connected directly to the switch and the beam port. However, other elements such as filter elements may be included between the switch and the beam port without detracting from the invention. The switching means are controlled by a controller 411 implemented as a software program running on a suitable processor.

The described architecture allows the controller to associate any modulator 405 with any beam by connecting a given modulator 405 with the power amplifier 409 connected to that beam port. It is apparent that the transmitter elements affected by the switch can vary significantly and can be simple modulators as described or can be entire multi-carrier transmitters. It is however preferred, although the invention is not limited to having the power amplifiers positioned after the switch rather than before the switch, as a low power switch which is significantly less complex and costly can be used.

The switching may also provide for connecting two modulators to the same power amplifier or in an alternative embodiment connecting two transmitters to the same beam port. An appropriate combiner must be introduced as is well known in the art. In a preferred embodiment the power amplifiers are single carrier amplifiers connected to the output of the switch. In this embodiment only a single modulator is connected to each power amplifier. This has the significant advantage of the amplifiers not having strict linearity requirements and therefore being significantly less costly.

At first sight, this may look like it will also have limited trunking capability. However, this is not the case since provision of additional amplifiers is possible for each beam. For example, for beam 1 two Power amplifiers can be used, so that the total number of power amplifier inputs is (B+1). The output of these two power amplifiers can be combined before being fed to the beam port of the beam former. In this way the traffic carrying capability in each beam is bought at the cost of additional power amplifiers and not by requiring additional carrier frequencies. In the extreme, as many power amplifiers could be supplied to each beam as there are modulators.

In the preferred embodiment, the receiving and transmitting antenna array system described are combined, for example in a base station. The operation of the antenna system is considered in time intervals and for each time interval the switching means will associate transceiver elements (transmitter elements or receiver elements) as appropriate for that time interval. For a GSM system, the association of antenna beams with transceiver elements is updated every time slot to reflect the subscriber units served by the base station in that time slot. The switching means for the receiver and transmitter sub-systems are preferably independent so that any receiver element can be associated with any beam port regardless of the association of transmitter elements (and vice versa).

Figures 5, 6:
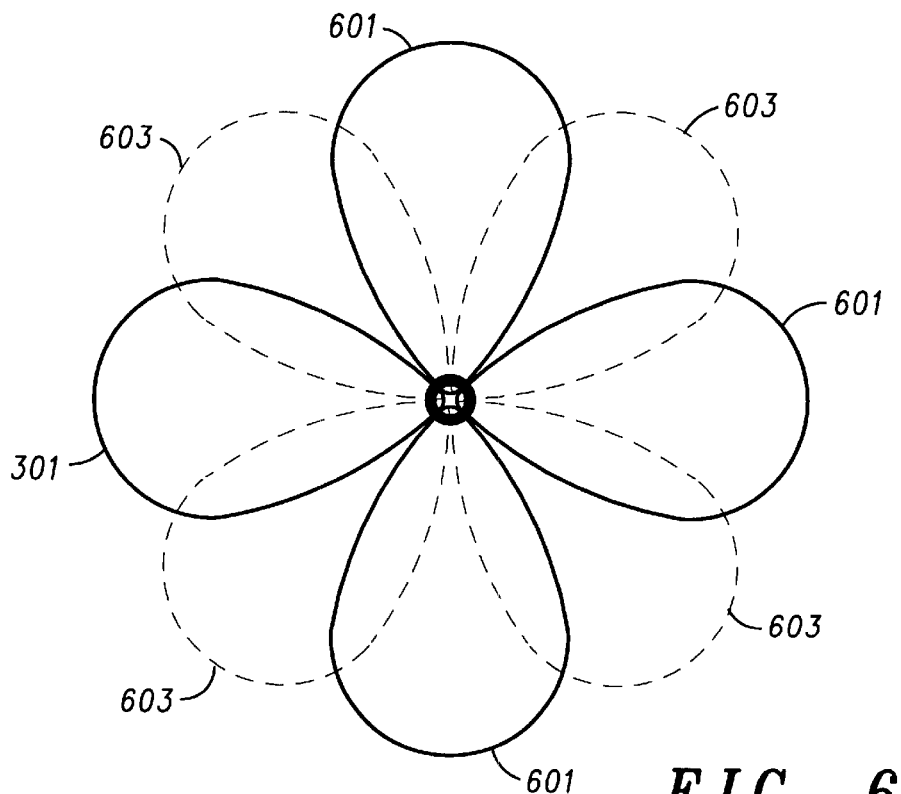
FIG. 5 illustrates an example association of transceiver elements with beam ports in accordance with the invention.
FIG. 6 shows an example of overlaid beams from two diversity antenna arrays in accordance with the invention.

FIG. 5 illustrates the association of transmitter elements to directional beams. In this example the beam former provides a beam port for each of four directional beams (B=4). The system comprise 3 (C=3) modulators or transmitters (TRX 1–3). Each beam port has one power amplifier associated except for beam 1 which has two associated power amplifiers and hence provide two inputs to the switching means (Beam 1A and 1B). This exemplifies a situation where the traffic into beam 1 is known to be higher and hence the system has been dimensioned appropriately.

As can be seen from FIG. 5, each transmitter can switch onto different beams for each timeslot. In timeslot 0, two transmitters (TRX1 and 3) are serving two subscriber units in Beam 1. This is possible due to two power amplifiers being connected to the beam port of Beam 1. A user in Beam 3 is furthermore served by transmitter TRX 2. As there are only three transmitters no further subscriber units can be supported in timeslot 0. In timeslot 1 TRX 1 serves a subscriber unit in Beam 1 and TRX 3 serves a subscriber unit in Beam 2. TRX 2 is not serving any subscriber units and can if requested be assigned to any of the Beams 1,3 or 4 but not to Beam 2 as this only has one power amplifier associated and this is used by TRX 3. In the case shown, the system is nearly fully loaded and only three slots are available (Timeslots 1,2 and 5).

Even in this case, it can be seen that the arrangements can create blocking; for example, only one more call could be accommodated in Beam 2, two in Beam 3, and three in Beam 4. As every new power amplifier creates a new row in the table this can be achieved by adding further power amplifiers. The position of power amplifiers following the switch thereby permits easy and cost efficient dimensioning of the entire antenna array by dimensioning the system using simple and efficient single carrier power amplifiers.

The allocation of receiver elements serving a specific subscriber unit to beam ports is not limited to being in response to characteristics of just that subscriber unit. Rather, a global optimisation is preferred where the association is done so that the best total performance for all users is obtained. As an example, if measurements show that a first subscriber unit is best served by Beam 1, but can also be adequately served by beam 2, whereas a second subscriber unit can only be served by beam 1, the first subscriber unit will be associated with beam 2. The association of transceiver elements serving a subscriber unit will thus typically be in response to characteristics of the radio conditions of both that and other subscriber units.

The preferred embodiment of the invention includes a second antenna array which provides diversity with the first antenna array. The radio signals received by the second antenna array are thus at least partly decorrelated with the signals received by the first antenna array. This can be achieved by a co-located but cross-polarised array (polarisation diversity) or by a co-polarised but sufficiently spatially separated array (spatial diversity) as is well known in the art. This array is connected to a beam former, which provides a number of beam ports corresponding to the directional beams of the array. The switch element is thus presented with an additional number of beam ports so that the total number of beam ports is the sum of the beam ports of the two individual antenna arrays. Preferably, the beams of the two decorrelated antenna arrays are offset and overlapping with respect to each other. This is illustrated in FIG. 6 where four directional beams 601 of the first antenna array are overlapped by four directional beams 603 of the second antenna array, these beams furthermore being offset by around half the angle between boresight of adjacent beams.

The overlapping and offsetting of the diversity beams provide several advantages. A static subscriber unit is due to the overlapping likely to be able to be served by at least two beams. Due to the decorrelation between the antenna arrays, alternating the serving beam between the two possible beams may improve the reception in a fading channel due to the error correction and interleaving. It furthermore allows for a significantly more flexible resource allocation. For example, a subscriber unit may currently be served by Beam A although both Beam A and Beam B are capable of serving the subscriber unit. If a different subscriber unit moves into the area served by Beam A, the first subscriber unit can be switched to Beam B permitting Beam A to serve the new user.

In its simplest form, the algorithm for associating transceiver elements with beams will simply assign a free transceiver element/timeslot/beam combination only if the wanted beam is not already being used for the same timeslot.

In a more efficient implementation, the receiving system is used to provide data in order to construct a beam ranking table, which is used to assign a single transmitting beam for each subscriber unit.

If a sufficient number of receivers are provided then the wanted signal power in each beam can be estimated for every single burst (for example, by using the training sequence correlation as is well known in the art). Averaging of this quantity can be used to construct a table of received power $P_{beam}$ on a per-beam basis. This could be similar to the standard RXLEV average measurement in GSM except that wanted signal power from the specific subscriber unit rather than raw power is used.

If fewer receivers are provided, the switch is used to select a number of beams in each burst. The table of $P_{beam}$ can still be constructed, but it will be incomplete. In this case, it is preferred that additional receiver capacity be available to provide estimates of received signal level of the wanted signal level of all subscriber units and for all beams not covered. This can be achieved by making use of idle receivers or idle slots in active receivers. The fewer receiver elements, the more critical this function will be. In the limit cases, it would probably be necessary to have a separate scanning receiver, which is dedicated to scanning the beams for the purpose of generating power level measurements. An alternative technique to construct this table is to always use the top ranking beam in the receiver, but otherwise alternate the switch between all other beams to collect sufficient data.

An important feature of this system is that the two sets of beams available come from two diversity antenna arrays. If the number of selected beams used to support a subscriber unit is 2 or greater, beams from both branches should be used. For example, if there is sufficient receiver capacity to allocate two receivers to a single user then one receiver should use the highest ranked beam from one antenna array while the other receiver should use the highest ranked beam from the diversity antenna array. In this way, both interferer reduction and diversity combining can be obtained in a single, transparent combiner process.

A further characteristic of this system is that it will be possible to select the subscriber units that will use their best beam according to a useful criterion. A simple algorithm would consist of allowing subscriber units with low path loss (i.e. closer to the BTS) to be served by downlink beams lower in their priority order, while subscriber units with higher path loss would be served by their top downlink beams. If uplink power control is being used, then obviously the measured uplink Pbeam values would have to be compensated for.

In the following an example algorithm for beam assignment in an antenna array system deployed as GSM base station is presented. The basic goal of the example algorithm is to avoid beam blocking, by keeping power amplifier load as uniform as possible, minimise use of the sector antenna and also if possible minimise the number of explicit internal handovers (rather than beam switches).

When a new call arrives, and after analysis of the RACH and possibly uplink SDCCH slots, the controller will have knowledge of a priority list of beams for this subscriber unit based on estimates of the useful signal power per beam $P_{beam}$ (this list will be slowly updated during the call). A simple algorithm for joint TCH/beam assignment is:

1. Check that there is TCH and/or BCCH transceiver capacity available. Call blocked if no circuits are available (or queuing/retry algorithms are triggered, as usual).
2. If only BCCH capacity is available, assign call to BCCH.
3. If TCH transceiver capacity is available, estimate downlink received signal level for the best beam (i.e. that with the highest uplink $P_{beam}$) using the estimated uplink path loss.
4. For each beam in the list, estimate the power loss in dB with respect to the best beam for the particular subscriber unit.
5. Check how many timeslots are available in each of the beams in the list, rank beam in order of number of slots available.
6. Assign call to the beam, which has more timeslots available, provided the power loss in that beam does not take the estimated downlink signal level below a certain level (e.g. 25). If this is not the case, test the second beam in the ranked list, etc. If no beams pass the power test, set up on the beam with highest uplink $P_{beam}$ if a timeslot is available. If beams are ranked equal in terms of timeslots and pass the power test, either take lower loss or higher loss beam (aggressive/timid strategy).
7. If no beams can be assigned, use a slot in a widebeam anteanna (such as a sector antenna or an omnidirectional (e.g. BCCH) antenna. If this is still not possible, again the call is blocked, queued or redirected.

At regular intervals, checks are performed to test whether the beam used is still acceptable (again using estimates of the path loss and/or signal level values). Changes are made if either the power is now considered too low or if by rearranging beams, the number of free timeslots across beams becomes more uniform.

When a call is completed, and therefore a slot is released in a particular beam, the following algorithm is applied:

1. If there are any calls currently operating in a wide beam antenna, pre-select those that could use the released beam; of these, select the one that is on the same timeslot (no handover required); if none are, select either the one that has lower or higher power (uplink $P_{beam}$) in the released beam.
2. If above is not successful, check calls on beams and move a call to the released beam only if the number of free timeslots across beams becomes more uniform (e.g. a call in a highly utilised beam can be assigned to the released beam/slot). For example, pre-select calls on the highest loaded beam which could use the released beam, of these select the one that is on the same timeslot (no handover required); if none are, select either the one that has lower or higher power (uplink $P_{beam}$) in the released beam. If this is not possible, move on to the next beam in terms of loading etc.

It is clear that there are many possible and obvious variations to this algorithm.

Whenever the subscriber unit is moved from one beam to another either in uplink or downlink or both, it is likely that a step readjustment in power control will be needed. Therefore, the dynamic performance of the power control loop associated with this subscriber unit is changed when such a handover occurs. The change will allow faster settling time of the loop and hence a reduced degradation caused by the power step. In one embodiment, individual timers are included for both uplink and downlink per subscriber unit. Both timers are reset to 0 whenever a beam switch occurs. If the timer value is below a given value, then the power control step size could be increased (e.g. from its normal value of 2 dB to 4 or even 6 dB) with respect to its normal value. The threshold could correspond for example to about 5 s.

Figure 7:
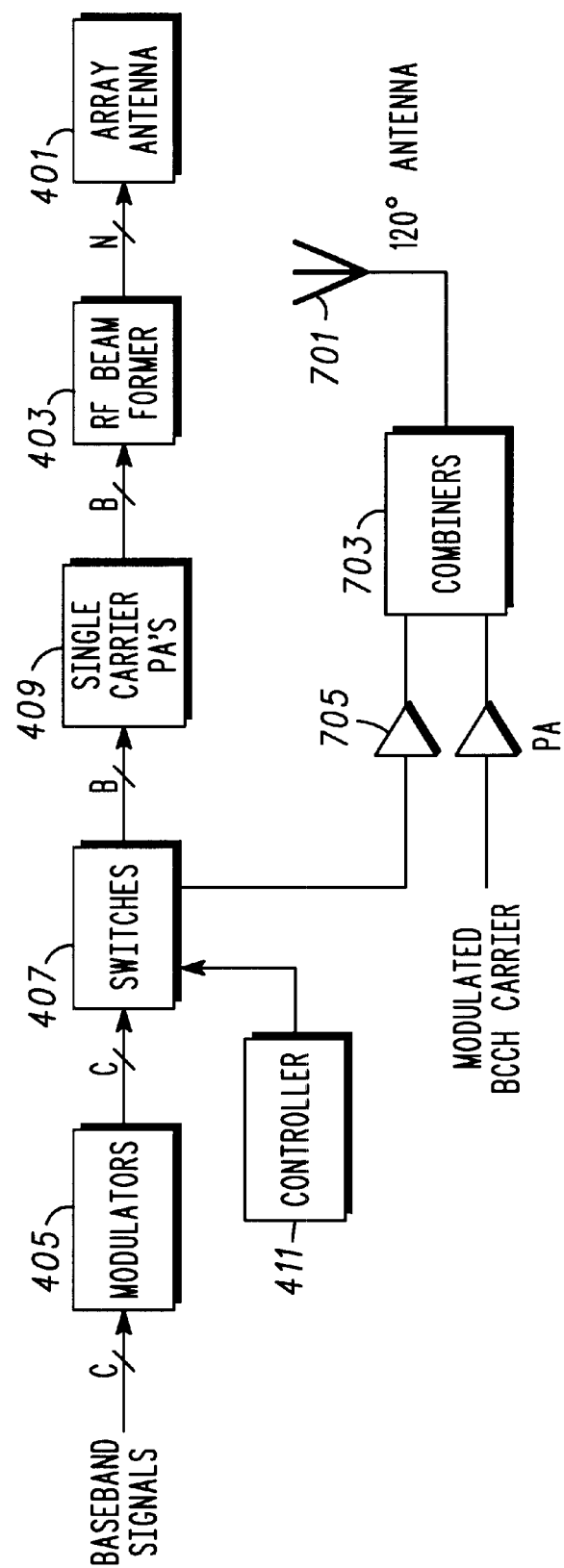
FIG. 7 illustrates an embodiment of a transmitting antenna array system further comprising a widebeam antenna in accordance with the current invention.

In accordance with an alternative embodiment of the invention the antenna array system also comprises a wide beam antenna such as a sector or omni directional antenna often used in current GSM base stations. This is illustrated in FIG. 7 which shows the antenna array system 700 of FIG. 4 enhanced with a 120° sector antenna 701. The sector antenna is coupled into the switch 407 through a combiner 703 and a power amplifier 705. The switch is thus capable of associating transceiver elements serving a specific subscriber unit to the sector antenna 701. The combiner 703 combines the signal from the switch and the GSM pilot and broadcast carrier known as a BCCH carrier.

In this embodiment, if a subscriber unit cannot be served by a directional beam because of the resource for that beam being allocated elsewhere, it can still be supported by the sector antenna. This is achieved by connecting the transceiver element supporting this subscriber unit with the sector antenna through the switch. Because of the wider beam coverage this will result in increased interference in the downlink direction. Preferably, the subscriber units served by the sector antenna will be subscriber units using discontinuous transmission whereby the interference is reduced. In GSM this is known as DTX transmission. In this way the allocation of subscriber units on the directional beam and widebeam antennas are dynamically updated in response to the current characteristics of the communication being supported.

Alternatively, the generated downlink interference can be reduced by rather than assigning a specific call to the sector antenna, calls in the saturated beam are hopped through this beam (and/or adjacent beams) and the sector antenna. In this way all calls use the widebeam antenna in some timeslots and the current characteristic of the individual call is not taken into account.

If it is found that particular beams are often overloaded and tend to generate more overflows into the sector antenna, calls on such beams should be encouraged to hand over to a neighbour base station where possible. This will reduce the beam blocking rate provided the corresponding beams on other cells are not themselves overloaded at the same time. A simple way of achieving this is to set handover margin offsets on a per beam basis. For example, a beam with low blocking should have an offset of 0 dB, so normal hysteresis on handover will apply. A beam with high level of blocking could be given say a 3 dB offset, so that calls would be handed over to surrounding base stations at lower signals (by 3 dB) than normal. Effectively this reduces the cell radius on a per-beam basis.

Furthermore, to avoid excessive ping-pong between cells, it is preferred that, after a handover the threshold for handing back to the previous serving cell is increased for a certain duration. This duration is set by a timer (e.g. 20 sec.) and after this timer expires, normal operation would resume.

One other feature of the system outlined so far is that the reported signal level values for the downlink may be lower than they would be for a BCCH traffic channel; this is because the call may be using a sub-optimal beam on downlink. This is acceptable for power control, but not for handover—e.g. handover to other cells should be decided on potential coverage, not specific loss of beam coverage, which is handled by beam switch as discussed.

This can be avoided if the downlink signal level measurements are disregarded for handover purposes. Preferably, however the serving BCCH is included in the neighbour list transmitted to the subscriber units. The neighbour list informs the subscriber unit of which neighbour pilot signals to measure and by including the serving base station in this list, measurements of the serving cell pilot signal is included. This allows evaluation of the potential coverage from the serving base station and allows full knowledge of loss due to beamforming.

What we claim is:

1. An antenna array system incorporated in a base station of a cellular communication system comprising
   at least a first antenna array;
   first beamforming means providing a plurality of beam ports, each beam port being associated with a directional beam of the first antenna array;
   a plurality of transceiver elements;
   switching means for associating the plurality of transceiver elements with the plurality of beam ports; and
   wherein the plurality of transceiver elements by the switching means are dynamically associated with the plurality of beam ports in response to a desired beam direction for radio communication supported by each of the plurality of transceiver elements and the association of transceiver elements to beam ports is rearranged at substantially periodic intervals, and wherein a first handover threshold associated with a first directional beam is different from a second handover threshold associated with a second directional beam.

2. An antenna array system as claimed in claim 1, wherein the association of a first transceiver element of the plurality of transceiver elements to beam ports is at least partly in response to a parameter associated with a characteristic of a radio communication supported by a second transceiver element of the plurality of transceiver elements.

3. An antenna array system as claimed in claim 1 wherein the plurality of beam ports is larger than the plurality of transceiver elements.

4. An antenna array system as claimed in claim 1 further comprising
   at least a second antenna array providing at least partial diversity with respect to the first antenna array;
   at least second beamforming means increasing the plurality of beam ports by providing a further plurality of beam ports each being associated with a directional beam of the second antenna array;
   and wherein the directional beams of the second antenna array are offset and overlapping with respect to the directional beams of the first antenna array.

5. An antenna array system as claimed in claim 1 incorporated in a Time Division Multiple Access communication system and wherein the switching means are operable to change the association of the plurality of transceiver elements with the plurality of beam ports on a time slot basis.

6. An antenna array system as claimed in claim 1 further comprising means for altering a dynamic behaviour of a power control loop associated with a subscriber unit when a serving directional beam is changed from a first directional beam to a second directional beam of the antenna system.

7. An antenna array system as claimed in claim 1 incorporated in a base station and including means for increasing a handover threshold of the base station in a time interval following a handover whereby a reverse handover is opposed during the time interval.

8. An antenna array system as claimed in claim 1 further comprising means for transmitting a substantially omnidirectional pilot signal.

9. An antenna array system as claimed in claim 1 wherein the cellular communication system is a GSM system.

10. An antenna array system as claimed in claim 9 wherein a base station serving a subscriber unit by use of the antenna array is included in the neighbour list for that subscriber unit.

11. An antenna array system as claimed in claim 1 wherein the plurality of transceiver elements comprises receiver elements.

12. An antenna array system as claimed in claim 11 wherein at least one of the receiver elements is operable to evaluate a reception quality of a subscriber unit in a directional beam not serving the subscriber unit.

13. An antenna array system as claimed in claim 12 as dependent on claim 3 wherein the at least one of the receiver elements is operable to sequentially evaluate the reception quality of a subscriber unit in a plurality of directional beams not serving the subscriber unit including directional beams from both the first and second antenna array.

14. An antenna array system as claimed in claim 1 wherein the plurality of transceiver elements comprises transmitter elements.

15. An antenna array system as claimed in claim 14 comprising at least one power amplifier connected between the switching means and a beam port.

16. An antenna array system as claimed in claim 15 comprising at least one plurality of power amplifiers associated with one beam port and wherein the switching beams are operable to associate a signal associated with this beam port to each of the at least one plurality of power amplifiers.

17. An antenna array system as claimed in claim 14 further comprising at least one wide beam antenna wherein a radio communication is associated with the at least one wide beam antenna if a directional beam capable of supporting the radio communication is not available.

18. An antenna array system as claimed in claim 17 wherein a signal using discontinuous transmission is associated with the at least one wide beam antenna in preference to a signal not using discontinuous transmission.

19. An antenna array system as claimed in claim 1 wherein the plurality of transceiver elements comprises transmitter elements and receiver elements and the switching means are operable to independently associate receiver elements and transmitter elements with the plurality of beam ports.

20. An antenna array system as claimed in claim 19 wherein the association of transmitter elements in a transmitting direction is in response to measurements in a receiving direction.

21. An antenna array system as claimed in claim 20 wherein the measurements in the receiving direction is of a signal level of a wanted signal and at least one of the plurality of transmitter elements is associated with a beam port having the highest received signal level.

* * * * *